Jan. 9, 1940.   R. O. McCOY   2,186,303
PROCESS OF STEEPING CORN IN THE PRODUCTION OF STARCH
Filed July 11, 1938
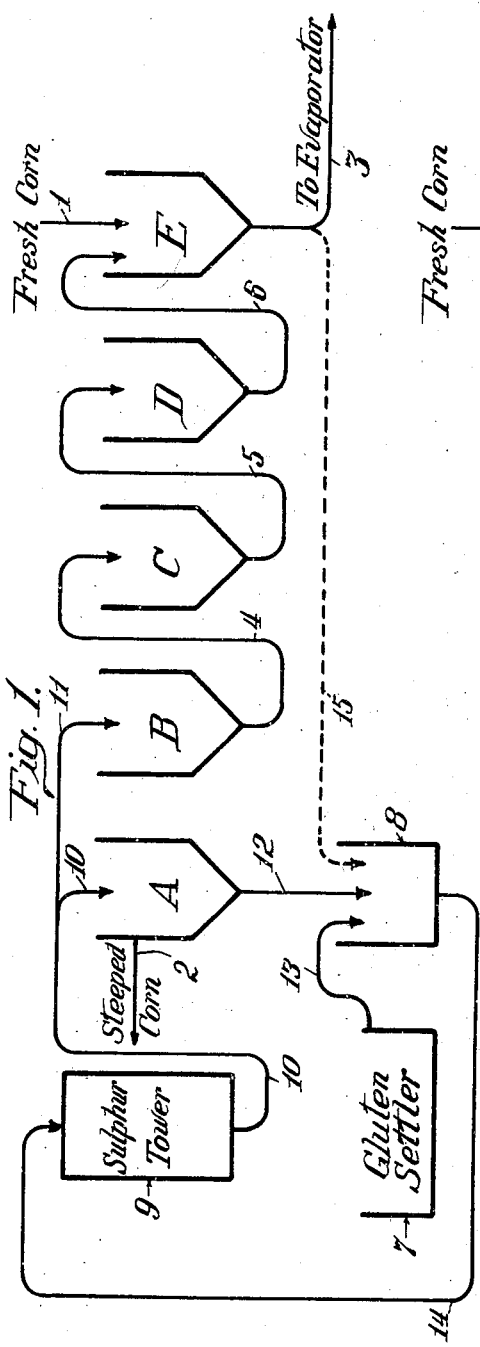
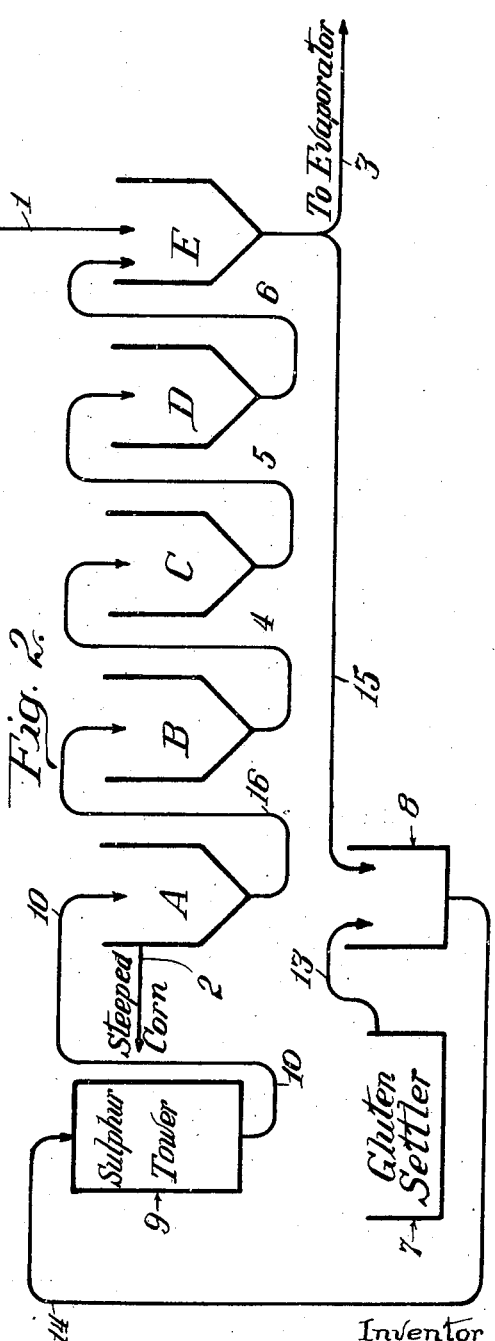

Patented Jan. 9, 1940

2,186,303

UNITED STATES PATENT OFFICE 2,186,303

PROCESS OF STEEPING CORN IN THE PRODUCTION OF STARCH

Rush O. McCoy, Berwyn, Ill., assignor to Corn Products Refining Company, New York, N. Y., a corporation of New Jersey Application July 11, 1938, Serial No. 218,613

10 Claims. (Cl. 127—68)

This invention relates to the production of starch from corn (maize) by the usual wet process wherein the corn is steeped with dilute sulphurous acid; and the object of the invention is to effect a change in the steeping process whereby the starch when cooked to a paste will have a higher viscosity, or Scott text index, than starches produced by methods heretofore used.

In the production of starch from corn, according to present methods, the corn is steeped in a series of steep tanks by a counter-current method using as steeping water either fresh water containing sulphur dioxide or more commonly now gluten settler water to which sulphur dioxide has been added. The steeping softens the corn kernels and extracts therefrom corn solubles which are recovered by evaporation of the light steep water. The term "light steep water" as used herein designates water withdrawn from the steeping system containing the solubles leached out by the steeping operation, while the term "steeping water" is intended to mean the water in the condition in which it is introduced into the steeping system.

The steeped corn is subjected to comminuting and separating operations, with which the present invention is not particularly concerned, for removal of the germ and separation of the starch from the hull and fiber and ultimately from the gluten. The water derived from the last operation, after the gluten has been removed therefrom by a settling or other equivalent operation, is the gluten settler water referred to above.

This method of obtaining starch from corn results in a slight modification, conversion or hydrolyzation of the starch which is evidenced by reduced viscosity of the paste made when the starch is cooked with water. The starch becomes, to some extent, thin boiling. This characteristic is due in part to the effect of the sulphur dioxide used in the steeping operation, which appears, however, to be necessary in order to prevent putrefaction and to achieve the proper softening effect on the corn kernel in order that the starch may readily separate from the other constituents of the corn.

The present invention is based upon the discovery that if there is added to the steeping water a certain amount of light steep water which, as has been said, contains corn solubles, the paste viscosity of the starch is considerably increased. Apparently the presence of the light steep water solubles protects the starch against the thinning or hydrolyzing effect of the sulphur dioxide without interfering with the normal functions of the acid in the steeping operation.

Starch paste viscosities are measured by what is known as the "Scott test" by a scale of figures which increase in accordance with the increase of viscosity. It has been found that if there be added to gluten settler steeping water having a density of 0.75° Baumé and containing the usual amount of sulphur dioxide, enough of the light steep water to increase the density to 1.3° Baumé, the Scott test index of the starch produced by the process will be raised from 70 to 85. The Scott figure of 70 is, of course, merely illustrative. The Scott of starch will depend on varying factors, particularly upon the character of the corn.

The invention is illustrated in the accompanying drawing in which Figures 1 and 2 are diagrams illustrating somewhat different applications of the invention to practice.

These embodiments of the invention are purely illustrative and it is not the intention to limit the invention to these two particular methods. The intention is to cover all modifications within the scope of the appended claims.

Referring to Fig. 1, the steeping system is shown as consisting of five steep tanks, A, B, C, D and E. The fresh corn is introduced into steep E at 1, the steeped corn is discharged from steep A at 2. The system is a countercurrent system, the fresh steeping water being introduced into the system at steeps A and B, and the steep water being withdrawn from the steep tank E, and all, or most of it, sent to the evaporators through pipe 3. It will be understood that the corn is not moved from E to D, C, B and A, but that the pipe connections are changed so that the same effect is obtained, that is, the fresh corn is steeped with the oldest steep water first, and then with progressively fresher steep water. Steep water withdrawn from B passes through pipe 4 to steep tank C. Steep water from C passes through pipe 4 to D and from D through pipe 6 to E.

In the system as shown, 7 designates the gluten settler from which the water, after the settling of the gluten has taken place, is removed and sent to the mixing tank 8. 9 designates the usual sulphur tower in which the steeping water is charged with sulphur dioxide in the usual amount between 1.01% and 0.2%. In the system as shown in Fig. 1, the steeping operation, properly speaking, ends with the treatment of the corn in the steep tank B. The corn in steep tank A is merely washed with the steeping water which is delivered to the tank A by pipe 10 from the sulphur tower, a branch pipe 11 leading from the tower to steep B. The washing liquor passes from steep tank A through pipe 12 to the mixing tank 8 into which the gluten settler water is delivered through pipe 13 from gluten settler 7. The gluten settler water may have a density of 0.75° Baumé. The light steep water from steep tank A has a higher density, because of its larger content of solubles and the addition of this water to the gluten settler water will ordinarily be sufficient to give the mixture which passes through pipe 13 from the mixing tank 8 to the sulphur tower the desired density of 1.3° Baumé up to say 2.0° Baumé. 0.5° Baumé represents about 0.1 pound of solubles per gallon. 1.3° Baumé represents about 0.18 pound of solubles per gallon and 2.0° Baumé represents about 0.27 pound per gallon.

If the above described procedure does not give a steeping water of sufficiently high density, additional light steep water from steep tank E may be introduced into the mixing vessel through pipe 14.

A modified arrangement is shown in Fig. 2. The same reference letters and numerals are used in this flow sheet so far as the instrumentalities designated thereby are identical. In the Fig. 2 arrangement, however, the corn is steeped in tank A from which the steep water passes through pipe 16 to tank B. The gluten water is supplied with additional corn solubles by the introduction into the mixing vessel 8 of light steep water from the steep tank E through pipe 14; this connection being optional in the arrangement of Fig. 1.

Within reasonable limits the raising of the Scott test index over that customary in the case of starch as heretofore produced is proportioned, more or less, to the increase in the amount of corn solubles introduced into the steeping water. However, there is in practice an upper limit since, as the corn solubles of the steeping water are increased, its effectiveness as a steeping agent, in respect particularly to the extraction of solubles from the corn is diminished. Practical limits have been indicated, but these must be regarded as approximations.

The Scott test above referred to employs a cup or funnel having a discharge tube in the bottom about 3.175 mm. long and with an orifice about 1.588 mm. in diameter which is closed by a plunger valve. The orifice is adjusted, if need be, as to diameter on the basis of a known standardized starch paste to give an index number of 100. 15 grams of 12% moisture starch is mixed with 280 cc. of distilled water at room temperature. The beaker containing the mixture is put into a boiling water bath and stirred constantly for five minutes by means of a mechanical agitator rotating at 200 revolutions per minute. At the end of five minutes the beaker is covered with a watch glass and the contents allowed to boil for another period of five minutes. At the end of ten minutes the watch glass is removed and the condensate drained back and stirred in for ten seconds. The watch glass is put back on the beaker and the mixture allowed to boil for one minute and fifty seconds or until twelve minutes time has elapsed. The watch glass is removed and the condensate stirred into the mixture for fifteen seconds. At the end of twelve minutes and fifteen seconds elapsed time, the contents of the beaker is transferred to the Scott cup and at the end of fifteen minutes total elapsed time, the plunger valve of the cup is withdrawn, allowing the paste to pass into a graduated cylinder arranged below the cup. The Scott index for any given paste is the number of seconds required for the delivery of 50 cc. of the starch paste from the cup. Gluten settler water has been used for steeping and contains a relatively small quantity of solubles as indicated above; but if such small amount of solubles has had any appreciable effect in checking the thinning of the starch brought about by the presence of sulphur dioxide, this had not been recognized prior to applicant's invention.

I claim:
1. In the process of obtaining starch from corn which comprises steeping the corn with water containing sulphur dioxide: the improvement which consists in adding corn solubles to the steeping water so as to increase the solubles content of the steeping water to a point at which the thinning influence of the sulphur dioxide on the starch is substantially decreased.

2. In the process of obtaining starch from corn which comprises steeping the corn with water containing sulphur dioxide: the improvement which consists in adding light steep water to the steeping water whereby decrease of the paste viscosity of the starch is minimized.

3. In the process of obtaining starch from corn which comprises steeping the corn with water containing sulphur dioxide: the improvement which consists in adding corn solubles to the steeping water to give the steeping water a density of about 1.3°–2.0° Baumé whereby decrease of the paste viscosity of the starch is minimized.

4. In the process of obtaining starch from corn which comprises steeping the corn with water containing sulphur dioxide: the improvement which consists in adding light steep water to the steeping water to give the steeping water a density of about 1.3°–2.0° Baumé whereby decrease of the paste viscosity of the starch is minimized.

5. In the process of obtaining starch from corn which comprises steeping the corn with gluten settler water containing sulphur dioxide: the improvement which consists in adding corn solubles to the steeping water whereby decrease of the paste viscosity of the starch is minimized.

6. In the process of obtaining starch from corn which comprises steeping the corn with gluten settler water containing sulphur dioxide: the improvement which consists in adding light steep water to the gluten settler water whereby decrease of the paste viscosity of the starch is minimized.

7. In the process of obtaining starch from corn which comprises steeping the corn with gluten settler water containing sulphur dioxide: the improvement which consists in adding corn solubles to the gluten settler water to give the steeping water a density of about 1.3°–2.0° Baumé whereby decrease of the paste viscosity of the starch is minimized.

8. In the process of obtaining starch from corn which comprises steeping the corn with gluten settler water containing sulphur dioxide: the improvement which consists in adding light steep water to the gluten settler water to give the steeping water a density of about 1.3°–2.0° Baumé whereby decrease of the paste viscosity of the starch is minimized.

9. The process of obtaining starch from corn which comprises steeping the corn with a steeping water containing sulphur dioxide and corn solubles to give it a density of about 1.3°–2.0° Baumé.

10. The process of obtaining starch from corn which comprises steeping the corn with gluten settler water, as a steeping water, containing sulphur dioxide and corn solubles to give it a density of about 1.3°–2.0° Baumé.

RUSH O. McCOY.